United States Patent
Suragani Venu et al.

(10) Patent No.: US 11,136,431 B2
(45) Date of Patent: Oct. 5, 2021

(54) CRYSTALLINE THERMOPLASTIC POLYURETHANE ARTICLE

(71) Applicant: Lubrizol Advanced Materials, Inc., Cleveland, OH (US)

(72) Inventors: Lalith B. Suragani Venu, North Royalton, OH (US); Joseph J. Vontorcik, Jr., Broadview Hts., OH (US); Gonzalo Lowenberg, Barcelona (ES)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 56 days.

(21) Appl. No.: 16/490,943

(22) PCT Filed: Feb. 28, 2018

(86) PCT No.: PCT/US2018/020079
§ 371 (c)(1),
(2) Date: Sep. 4, 2019

(87) PCT Pub. No.: WO2018/164893
PCT Pub. Date: Sep. 13, 2018

(65) Prior Publication Data
US 2020/0010604 A1 Jan. 9, 2020

Related U.S. Application Data

(60) Provisional application No. 62/467,300, filed on Mar. 6, 2017.

(51) Int. Cl.
| | | |
|---|---|---|
| *C08G 18/42* | (2006.01) | |
| *B29C 48/00* | (2019.01) | |
| *B29C 48/08* | (2019.01) | |
| *B29C 48/05* | (2019.01) | |
| *C08G 18/76* | (2006.01) | |
| *C08G 63/08* | (2006.01) | |
| *C08G 65/48* | (2006.01) | |
| *C08L 75/04* | (2006.01) | |
| *D01F 6/70* | (2006.01) | |
| *B29C 48/09* | (2019.01) | |
| *B29C 48/10* | (2019.01) | |

(52) U.S. Cl.
CPC ........ *C08G 18/4277* (2013.01); *B29C 48/022* (2019.02); *B29C 48/05* (2019.02); *B29C 48/08* (2019.02); *B29C 48/09* (2019.02); *B29C 48/10* (2019.02); *C08G 18/4238* (2013.01); *C08G 18/7671* (2013.01); *C08G 63/08* (2013.01); *C08G 65/48* (2013.01); *C08L 75/04* (2013.01); *D01F 6/70* (2013.01); *C08L 2203/16* (2013.01); *C08L 2203/18* (2013.01)

(58) Field of Classification Search
CPC ....... B29C 48/022; B29C 48/08; B29C 48/05; B29C 48/09; B29C 48/10; C08G 18/4277; C08G 18/4238; C08G 18/7671; C08G 63/08; C08G 65/48; C08L 75/04; C08L 2203/16; C08L 2203/18; D01F 6/70
See application file for complete search history.

(56) References Cited

U.S. PATENT DOCUMENTS

| | | |
|---|---|---|
| 5,821,180 A | 10/1998 | Iwata et al. |
| 6,995,231 B2 | 2/2006 | Onder |
| 2014/0107312 A1 | 4/2014 | Hu et al. |

FOREIGN PATENT DOCUMENTS

WO 2016144676 A1 9/2016

OTHER PUBLICATIONS

Van Gorp, Judith J., et al., Susterra Propanediol—Renewability, Sustainability, and Differentiating Performance in Urethane Applications, Polyurethanes Technical Conference, 2010 in Houston, TX, , Oct. 11, 2010, pp. 640-652, Arlington, VA.

*Primary Examiner* — Patrick D Niland
(74) *Attorney, Agent, or Firm* — Eryn Ace Fuhrer; Teresan W. Gilbert

(57) ABSTRACT

The disclosed technology relates to an article, such as a hose, tube, sheet, film, or filament made from a crystalline thermoplastic polyurethane composition, wherein the crystalline thermoplastic polyurethane composition comprises the reaction product of a polyisocyanate component, a polyester polyol component, optionally a chain extender component, and optionally a catalyst. The article is produced by melt or extrusion processes.

17 Claims, No Drawings

CRYSTALLINE THERMOPLASTIC POLYURETHANE ARTICLE

CROSS REFERENCE TO RELATED APPLICATION

This application claims priority from PCT Application Serial No. PCT/US2018/020079 filed on Feb. 28, 2018 which claims the benefit of U.S. Provisional Application No. 62/467,300 filed on Mar. 6, 2017, the entirety of all of which is hereby incorporated by reference.

The disclosed technology relates to an article, such as a hose, tube, sheet, film, or filament made using a crystalline thermoplastic polyurethane composition, wherein the crystalline thermoplastic polyurethane in accordance with the present invention provides improved properties to the article.

BACKGROUND OF THE INVENTION

Crystalline thermoplastic polyurethane (TPU) materials can provide beneficial properties to extruded shapes, such as hose, tube, sheets, films, and filaments. For example, crystalline TPU materials generally have stronger wear and solvent resistance than their relatively low crystalline counterparts. Further, the crystalline TPU materials are generally easier to handle after the polymer melt exists the shaping die. This can provide increased productivity and better final product quality.

However, generally crystalline, thermoplastic polyurethane (TPU) materials have typically not been utilized in extrusion applications as the compositions are generally difficult to process or are even unprocessable as they crystalize and form conglomerates or chunks of solid matter in the extrusion process equipment. Furthermore, attempts to prevent crystallization by increasing the processing temperature have been unsuccessful, resulting in heat-decomposed products. It would be desirable to have a crystalline TPU material that can be processed and made into articles by extrusion processes, such as extrusion spinning at high speeds without these drawbacks.

Prior art attempts to provide crystalline TPU that can be processed by extrusion methods have included adding a crystallization retarding components to the TPU to delay the crystallization, thereby avoiding appreciable solid or crystallization in the extruder. This process was described in U.S. Pat. No. 6,995,231. It would also be desirable to have a crystalline TPU composition that can be extrusion processed without the need for adding additional chemicals to delay the crystallization.

TPU materials have been developed that are useful in hot-melt adhesive (HMA) compositions which are solid at room temperature, become tacky or sticky upon heating, and typically solidify rapidly at ambient temperatures to develop internal strength and cohesion. PCT Patent Application Publication WO2016/144676 describes such a TPU composition. TPU materials useful as adhesives are generally believed to not be suitable for extrusion processes because of these properties. However, as these TPU may have useful properties for articles, it would be desirable to make articles from these TPU materials by extrusion.

The present invention provides a crystalline TPU material that can be extrusion processed to create extruded articles with improved properties.

SUMMARY OF THE INVENTION

The technology disclosed herein provides an extruded article made from a crystalline thermoplastic polyurethane composition. The crystallinity of a TPU material can be indicated by the melt enthalpy or cooling enthalpy of the TPU material as measured by Dynamic Scanning calorimetry (DSC) in accordance with ASTM D3418. In one embodiment, the crystalline TPU composition has a melt enthalpy ($\Delta H$) of at least about 17 J/g or even at least about 18 J/g and/or a cooling enthalpy of at least about 15 J/g or even at least about 16 J/g or even at least about 17 J/g. In one useful embodiment, the crystalline TPU can be melt extruded into a shape such as a hose, tube, sheet, film, or filament. In another useful embodiment, the melt extrusion can be done at high speeds, such as at least 1500 m/min.

In one embodiment, the extruded article of the present invention comprises a crystalline TPU comprising the reaction product of an isocyanate component, a polyol component, wherein the polyol component comprises a polycaprolactone polyester polyol, optionally, a chain extender component, and optionally, a catalyst. In one such embodiment, the chain extender is included in the composition.

In another embodiment, the extruded article of the present invention comprises a crystalline TPU comprising the reaction product of an isocyanate component, a polyol component, wherein the polyol component comprises polybutanediol succinate, optionally, a chain extender component, and optionally, a catalyst. In one such embodiment, the chain extender is included in the composition.

In one embodiment of the invention, the extruded article is a hose, tube, sheet, film, or filament made from a crystalline thermoplastic polyurethane composition comprising the reaction product of an isocyanate component, a polyol component, wherein the polyol component comprises a polyester polyol selected from polycaprolactone polyester polyol or polybutanediol succinate, and up to about 20% by weight of a co-polyester, optionally a chain extender component, and optionally, a catalyst. In one embodiment of the invention, the extruded article is a hose, tube, sheet, film, or filament made from a crystalline thermoplastic polyurethane composition comprising the reaction product of an isocyanate component, a polyol component, wherein the polyol component comprises a polyester polyol selected from polycaprolactone polyester polyol or polybutanediol succinate, and up to about 50% by weight of a co-polyether, optionally a chain extender component, and optionally, a catalyst.

In one embodiment, the extruded article is a hose, tube, sheet, film, or filament comprising the reaction product of a polyisocyanate component, a polyester polyol component, specifically, polycaprolactone polyester polyol or polybutanediol succinate, optionally a chain extender component, and optionally, a catalyst, wherein the crystalline thermoplastic polyurethane is substantially free of a crystallization retarding component, as described herein.

These elements are described in more detail below.

DETAILED DESCRIPTION OF THE INVENTION

Various preferred features and embodiments will be described below by way of non-limiting illustration.

The disclosed technology provides an extruded article, including but not limited to a hose, tube, sheet, film, or filament comprising a crystalline thermoplastic polyurethane composition. TPU compositions are generally made from the reaction of a) a polyol component, b) a polyisocynate component, and c) optionally, a chain extender component. The reaction may or may not be carried out in the presence of a catalyst.

The crystalline TPU compositions useful in the present invention include an isocyanate component. The isocyanate component may comprise one or more polyisocyanates. In some useful embodiments, the polyisocyanate component includes one or more diisocyanates. Suitable polyisocyanates include aromatic diisocyanates, aliphatic diisocyanates, or combinations thereof. In some embodiments, the polyisocyanate component includes one or more aromatic diisocyanates. In some embodiments, the polyisocyanate component is essentially free of, or even completely free of, aliphatic diisocyanates. In other embodiments, the polyisocyanate component includes one or more aliphatic diisocyanates. In some embodiments, the polyisocyanate component is essentially free of, or even completely free of, aromatic diisocyanates. In some embodiments, mixtures of aliphatic and aromatic diisocyanates may be useful.

Examples of useful polyisocyanates include aromatic diisocyanates such as 4,4'-methylenebis(phenyl isocyanate) (MDI), 3,3'-dimethyl-4,4'-biphenylene diisocyanate (TODI), 1,5-naphthalene diisocyanate (NDI), m-xylene diisocyanate (XDI), phenylene-1,4-diisocyanate, naphthalene-1,5-diisocyanate, and toluene diisocyanate (TDI); as well as aliphatic diisocyanates such as 1,6-hexamethylene diisocyanate (HDI), isophorone diisocyanate (IPDI), 1,4-cyclohexyl diisocyanate (CHDI), decane-1,10-diisocyanate, lysine diisocyanate (LDI), 1,4-butane diisocyanate (BDI), isophorone diisocyanate (PDI), and dicyclohexylmethane-4,4'-diisocyanate (H12MDI). Isomers of these diisocyanates may also be useful. Mixtures of two or more polyisocyanates may be used. In some embodiments, the polyisocyanate is MDI and/or H12MDI. In some embodiments, the polyisocyanate consists essentially of MDI. In some embodiments, the polyisocyanate consists essentially of H12MDI.

The TPU compositions described herein are also made using b) a polyol component. Polyols, which may also be described as hydroxyl terminated intermediates, useful in the present invention include polyester polyols, polyether polyols, and combinations thereof.

In one embodiment, the polyol component comprises a polycaprolactone polyester polyol. The polycaprolactone polyester polyols useful for making the TPU compositions described herein include polyester diols derived from caprolactone monomers. The polycaprolactone polyester polyols are terminated by primary hydroxyl groups. Suitable polycaprolactone polyester polyols may be made from ε-caprolactone and a bifunctional initiator such as diethylene glycol, 1,4-butanediol, or any of the other glycols and/or diols known in the art for this purpose. In some embodiments, the polycaprolactone polyester polyols are linear polyester diols derived from caprolactone monomers.

Useful examples include CAPA™ 2202A, a 2000 number average molecular weight (Mn) linear polyester diol, and CAPA™ 2302A, a 3000 Mn linear polyester diol, both of which are commercially available from Perstorp Polyols Inc. These materials may also be described as polymers of 2-oxepanone and 1,4-butanediol.

The polycaprolactone polyester polyols may be prepared from 2-oxepanone and a diol, where the diol may be 1,4-butanediol, diethylene glycol, monoethylene glycol, hexane diol, 2,2-dimethyl-1,3-propanediol, or any combination thereof. In some embodiments, the diol used to prepare the polycaprolactone polyester polyol is linear. In some embodiments, the polycaprolactone polyester polyol is prepared from 1,4-butanediol.

In another embodiment, the polyol component comprises a hydroxyl terminated polyester intermediate selected from linear polyesters having a number average molecular weight ($M_n$) of from about 500 to about 10,000, for example, about 3,000 to about 6,000 Daltons, further for example about 4,000 to about 6,000 Daltons. The molecular weight is determined by assay of the terminal functional groups and is related to the number average molecular weight.

In general, polyester intermediates are produced by (1) an esterification reaction of one or more glycols with one or more dicarboxylic acids or anhydrides or (2) by transesterification reaction, i.e., the reaction of one or more glycols with esters of dicarboxylic acids. Mole ratios generally in excess of more than one mole of glycol to acid are preferred so as to obtain linear chains having a preponderance of terminal hydroxyl groups. The dicarboxylic acids polyester may include aliphatic, cycloaliphatic, aromatic, or combinations thereof. Dicarboxylic acids may be used alone or in mixtures and generally have a total of from 4 to 15 carbon atoms and include: succinic, glutaric, adipic, pimelic, suberic, azelaic, sebacic, isophthalic, terephthalic, cyclohexane dicarboxylic, and the like. Anhydrides of the above dicarboxylic acids such as phthalic anhydride, tetrahydrophthalic anhydride, or the like, can also be used. The glycols which are reacted to form a desirable polyester intermediate can be aliphatic, aromatic, or combinations thereof, and have a total of from 2 to 20 or from 2 to 12 carbon atoms. Suitable examples include ethylene glycol, 1,2-propanediol, 1,3-propanediol, 1,3-butanediol, 1,4-butanediol, 1,5-pentanediol, 1,6-hexanediol, 2,2-dimethyl-1,3-propanediol, 1,4-cyclohexanedimethanol, decamethylene glycol, dodecamethylene glycol, and mixtures thereof.

In one useful embodiment, the polyol component of the invention comprises a polyester based on succinic acid: polybutane diol succinate. The succinic acid used to form the polyester may be derived from biomass resources, petroleum resources, or mixtures thereof. When succinic acid is obtained from petroleum resources, malic acid is usually formed as a by-product and incorporated as an impurity into the succinic acid. For example, succinic acid obtained from petroleum resources may contain from 1,500 ppm to 5,000 ppm malic acid. Succinic acid obtained from biomass resources may contain less than 1,500 ppm malic acid and in some cases less than 1,000 ppm malic acid. In some cases, succinic acid obtained from biomass resources may contain 0 ppm malic acid.

In one useful embodiment, the polybutane diol succinate has a molecular weight of about 1,000 to about 12,000 Daltons determined by assay of the terminal functional groups. In another useful embodiment, the polybutane diol succinate has a molecular weight of about 3,000 to about 6,000 Daltons, for example about 4,000 to about 6,000, further for example about 4,400 to about 6,000, further for example, about 5,000 to about 6,000. In other embodiments, the polybutanediol succinate has a molecular weight that is greater than 4,000, for example, 4,400 or greater, further for example, 5,000 or greater.

Certain TPU compositions useful in the present invention are described in WO2016/144676 which is hereby incorporated by reference.

In one embodiment, in the TPU composition used to make extruded articles of the present invention, the polyester polyol, for example polycaprolactone polyester polyol or polybutane diol succinate comprises at least 50% by weight of the total polyol component. In some embodiments, polybutanediol succinate comprises at least 60%, at least 70%, at least 75%, at least 80%, at least 90%, at least 95%, or 100% of the total polyol component. In some embodiments, the polyol component consists essentially of polybutanediol succinate. In other embodiments, the polyester polyol consists essentially of polycaprolactone polyester polyol.

The polyol component of the present invention may further comprise up to about 50% by weight of a co-polyol, for example up to about 40% by weight, further for example, up to about 30% by weight, even further for example, up to about 20% by weight, and even further for example, up to about 10% by weight. Suitable co-polyols, when present, may include one or more hydroxyl terminated polyesters, one or more hydroxyl terminated polyethers, or mixtures thereof. In one useful embodiment, where the polyol component used to form the TPU composition includes a copolyester, the copolyester is present in an amount that is no more than 20% by weight of the total polyol component. In an alternative embodiment, a co-polyether, for example, polytetramethylene glycol, may be used in amount of up to 50% of the total polyol component. Combinations of co-polyols may also be used provided that the total co-polyester does not exceed 20% by weight of the total polyol component or the total co-polyether does not exceed 50% by weight of the total polyol component. In some embodiments, the polyol component is substantially free of co-polyols. In other embodiments, the polyol component is totally free of co-polyols.

Suitable polyether polyols that may be useful as a copolyether in the polyol component of the TPU of the present invention include polyether polyols derived from a diol or polyol having a total of from 2 to 15 carbon atoms. In some embodiments, the hydroxyl terminated polyether is an alkyl diol or glycol which is reacted with an ether comprising an alkylene oxide having from 2 to 6 carbon atoms, typically ethylene oxide or propylene oxide or mixtures thereof. For example, hydroxyl functional polyether can be produced by first reacting propylene glycol with propylene oxide followed by subsequent reaction with ethylene oxide. Primary hydroxyl groups resulting from ethylene oxide are more reactive than secondary hydroxyl groups and thus are preferred. Useful commercial polyether polyols include poly (ethylene glycol) comprising ethylene oxide reacted with ethylene glycol, poly(propylene glycol) comprising propylene oxide reacted with propylene glycol, poly(tetramethylene glycol) comprising water reacted with tetrahydrofuran which can be described as polymerized tetrahydrofuran, and which is commonly referred to as PTMEG.

The TPU compositions described herein are made using optionally c) a chain extender component. In some embodiments, the TPU composition of the invention includes a chain extender along with the other components described herein. Suitable chain extenders include diols, diamines, and combination thereof.

Suitable chain extenders include relatively small polyhydroxy compounds, for example lower aliphatic or short chain glycols having from 2 to 20, or 2 to 12, or 2 to 10 carbon atoms. Suitable examples include ethylene glycol, diethylene glycol, propylene glycol, dipropylene glycol, 1,4-butanediol (BDO), 1,6-hexanediol (HDO), 1,3-butanediol, 1,5-pentanediol, neopentylglycol, 1,4-cyclohexanedimethanol (CHDM), 2,2bis[4-(2-hydroxyethoxy) phenyl] propane (HEPP), hexamethylenediol, heptanediol, nonanediol, dodecanediol, 3-methyl-1,5-pentanediol, ethylenediamine, butanediamine, hexamethylenediamine, and hydroxyethyl resorcinol (HER), and the like, as well as mixtures thereof. In some embodiments the chain extender includes BDO, HDO, 3-methyl-1,5-pentanediol, or a combination thereof. In some embodiments, the chain extender includes BDO. Other glycols, such as aromatic glycols could be used. In some embodiments, the composition is formed using only less than 8% by weight, for example, less than 5%, further for example, less than 4%, even further for example, less than 3%, further for example, less than 2%, further for example, less than 1%, and even further for example, less than 0.5% by weight of the total reactants of a chain extender. In some embodiments, the TPUs described herein are essentially free of or even completely free of chain extender, for example 1,4 butane diol.

Optionally, one or more polymerization catalysts may be present during the polymerization reaction. Generally, any conventional catalyst can be utilized to react the diisocyanate with the polyol intermediates or the chain extender. Examples of suitable catalysts which in particular accelerate the reaction between the NCO groups of the diisocyanates and the hydroxy groups of the polyols and chain extenders are the conventional tertiary amines known from the prior art, e.g. triethylamine, dimethylcyclohexylamine, N-methylmorpholine, N,N'-dimethylpiperazine, 2-(dimethyl aminoethoxy)ethanol, diazabicyclo[2.2.2]octane and the like, and also in particular organometallic compounds, such as titanic esters, iron compounds, e.g. ferric acetylacetonate, tin compounds, e.g. stannous diacetate, stannous octoate, stannous dilaurate, bismuth compounds, e.g. bismuth trineodecanoate, or the dialkyltin salts of aliphatic carboxylic acids, e.g. dibutyltin diacetate, dibutyltin dilaurate, or the like. The amounts usually used of the catalysts are from 0.001 to 0.1 part by weight per 100 parts by weight of polyol component. In some embodiments, the reaction to form the TPU of the present invention is substantially free of or completely free of catalyst.

In a useful embodiment of the present invention, the TPU is crystalline as indicated by the melt enthalpy and/or cooling enthalpy measured by DSC in accordance with ASTM D3418.

The TPU composition, in one embodiment, has a melt enthalpy ($\Delta H$) of at least 17 J/g and/or a cooling enthalpy of at least 15 J/g or even at least 16 J/g. In one embodiment, the polyol component of the TPU composition is a polyester polyol, and the TPU composition has a melt enthalpy ($\Delta H$) of at least 17 J/g or even at least about 18 J/g and/or a cooling enthalpy of at least about 15 J/g or even at least about 16 J/g. In another useful embodiment, the TPU has a melt enthalpy ($\Delta H$) of at least about 20 J/g, or even at least about 30 J/g, or even at least about 40 J/g, or even at least about 45 J/g, about 46 J/g, or about 47 J/g and/or a cooling enthalpy of at least about 30 J/g or even at least about 40 J/g, or even at least about 45 J/g, or even at least about 46 J/g, or at least about 47 J/g. In one embodiment, the polyol component of the TPU composition comprises or even consists of a polycaprolactone polyester polyol and has a melt enthalpy of at least 17 J/g and/or a cooling enthalpy of at least 15 J/g or even at least 16 J/g. In another embodiment, the polyol component of the TPU composition comprises polybutanediol succinate or even consists of polybutanediol succinate, and has a melt enthalpy of at least 20 J/g, or even 30 J/g, or even 40 J/g, or even 45 J/g, or even 47 J/g and/or a cooling enthalpy of at least 30 J/g, or even at least 40 J/g, or even at least 45 J/g, 46 J/g, or 47 J/g.

Various types of optional components can be present during the polymerization reaction, and/or incorporated into the TPU elastomer described above to improve processing and other properties. These additives include but are not limited to antioxidants, such as phenolic types, rheology modifiers, such as hydrophobic or hydrophilic fumed silica, and adhesion promoters, such as malonic acid, fumaric acid, chlorinated rubber, vinyl chloride/vinyl acetate copolymers, vinyl chloride/vinyl acetate/maleic acid terpolymers. Other additives may be used to enhance the performance of the TPU composition or blended product, such as other resins, including but not limited to coumarone-indene or terpenephenolic which may help increase the tackiness of the hot-melt adhesive when hot and slow the recrystallization time. All of the additives described above may be used in an effective amount customary for these substances.

The crystalline TPU composition used to make the articles of the present invention may also contain one or more additional additives. These additional additives can be utilized in suitable amounts and include opacifying pigments, colorants, mineral fillers, stabilizers, lubricants, UV absorbers, processing aids, and other additives in order to provide desired properties to the TPU composition and the article. Examples of opacifying pigments include titanium dioxide, zinc oxide, and titanate yellow. Tinting pigments include, but are not limited to, carbon black, yellow oxides, brown oxides, raw and burnt sienna or umber, chromium oxide green, cadmium pigments, chromium pigments, and other mixed metal oxide and organic pigments. Useful fillers include diatomaceous earth (superfloss) clay, silica, talc, mica, wollastonite, barium sulfate, and calcium carbonate. If desired, useful stabilizers such as antioxidants can be used and include phenolic antioxidants, while useful photostabilizers include organic phosphates, and organotin thiolates (mercaptides). Useful lubricants include metal stearates, paraffin oils, and amide waxes. Useful UV absorbers include 1-(2'-hydrooxyphenol) benzotriazoles and 2-hydroxybenzophenones.

These additional additives can be incorporated into the components of, or into the reaction mixture for, the preparation of the TPU resin, or after making the TPU resin. In another process, all the materials can be mixed with the TPU resin and then melted or they can be incorporated directly into the melt of the TPU resin.

In one embodiment, the extruded article, such as a hose, tube, sheet, film, or filament, is made from a TPU composition as described herein in detail, but where the TPU composition is substantially free of a crystallization retarding component. Crystallization retarding components are components that will shift the crystallization temperature of a TPU composition when compared to the same compositions without the crystallization retarding component. For example, crystallization retarding components, include, but are not limited to dipropylene glycol, tripropylene glycol, diethylene glycol, triethylene glycol, cis-trans-isomers of cyclohexyl dimethylol, neopentyl glycol, and substituted alkane glycols such as 1,3-butane diol, and 2-methyl-2,4-pentane diol. The TPU compositions may be substantially free of or totally free of these components. Other examples of crystallization retarding components that may be excluded from the TPU compositions used in the present invention include branched or substituted alkane diols having from about 2 up to about 12 carbon atoms in the main chain. In one embodiment, the crystalline TPU composition provided herein is free of or substantially free of crystallization retarding components, including those listed herein.

The TPU in accordance with the present invention can be manufactured by any known or yet to be developed means known to those of ordinary skill in the art.

For example, the components of this invention: (a) the diisocyanate component, (b) the polyol component, and (c) the optional chain extender component are reacted together to form the TPU useful in this invention. Any known processes to react the reactants may be used to make the TPU. In one embodiment, the process is a so-called "one-shot" process where all the reactants are added to an extruder reactor and reacted. The equivalent weight amount of the diisocyanate to the total equivalent weight amount of the hydroxyl containing components, that is, the polyol intermediate and, if included, the chain extender glycol, can be from about 0.5 to about 1.10, or, from about 0.5 to about 1.0, or from about 0.5 to about 0.90. Reaction temperatures utilizing a urethane catalyst can be from about 175 to about 245° C., and in another embodiment from 180 to 220° C.

As another example, the TPU can also be prepared utilizing a pre-polymer process. In the pre-polymer route, the polyol component reacted with generally an equivalent excess of one or more diisocyanates to form a pre-polymer solution having free or unreacted diisocyanate therein. The reaction is generally carried out at temperatures of from about 80 to about 220° C., or from about 150 to about 200° C. in the presence of a suitable urethane catalyst. Subsequently, a chain extender, as noted above, is added in an equivalent amount generally equal to the isocyanate end groups as well as to any free or unreacted diisocyanate compounds. The overall equivalent ratio of the total diisocyanate to the total equivalent of the polyol intermediate and the chain extender is thus from about can be from about 0.5 to about 1.10, or, from about 0.5 to about 1.0, or from about 0.5 to about 0.90. The chain extension reaction temperature is generally from about 180 to about 250° C. or from about 200 to about 240° C. Typically, the pre-polymer route can be carried out in any conventional device including an extruder. In such embodiments, the polyol intermediates are reacted with an equivalent excess of a diisocyanate in a first portion of the extruder to form a pre-polymer solution and subsequently the chain extender is added at a downstream portion and reacted with the pre-polymer solution. Any conventional extruder can be utilized, including extruders equipped with barrier screws having a length to diameter ratio of at least 20 and in some embodiments at least 25.

In one embodiment, the ingredients are mixed on a single or twin screw extruder with multiple heat zones and multiple feed ports between its feed end and its die end. The ingredients may be added at one or more of the feed ports and the resulting TPU composition that exits the die end of the extruder may be pelletized.

The preparation of the various polyurethanes in accordance with conventional procedures and methods and since as noted above, generally any type of polyurethane can be utilized, the various amounts of specific components thereof, the various reactant ratios, processing temperatures, catalysts in the amount thereof, polymerizing equipment such as the various types of extruders, and the like, are all generally conventional, and well as known to the art and to the literature.

The described process for preparing the TPU of the invention includes both the "pre-polymer" process and the "one-shot" process, in either a batch or continuous manner. That is, in some embodiments the TPU may be made by reacting the components together in a "one shot" polymerization process wherein all of the components, including reactants are added together simultaneously or substantially simultaneously to a heated extruder and reacted to form the TPU. While in other embodiments the TPU may be made by first reacting the polyisocyanate component with some portion of the polyol component forming a pre-polymer, and then completing the reaction by reacting the prepolymer with the remaining reactants, resulting in the TPU.

After exiting the extruder, the composition is normally pelletized and stored in moisture proof packaging and is ultimately sold in pellet form. It being understood that the composition would not always need to be pelletized, but rather could be extruded directly from the reaction extruder through a die into a final product profile. For example, extruded articles such as hoses, tubes, films, and sheets can be made by this process. In the alternative, the pellets can be further processed by extrusion into articles such as hoses, tubes, films, sheets and filaments.

In one embodiment of the invention, the article is a filament. The filament is made from a TPU composition as fully described in various embodiments herein. The filament may be made by extrusion spinning (also known as melt-spinning). Extrusion spinning is a well-known process in which a polymer is melted by extrusion, passed through a spinning nozzle into air, solidified by cooling, applied finish oil or lubricant for easy unwinding and collected by winding the filaments on a collection device. Typically the filaments are melt spun at a polymer temperature of about 150° C. to about 300° C.

One embodiment of the invention provides a method of making a filament using a TPU composition as fully described in various embodiments herein wherein the filament is made by extrusion-spinning (melt-spinning) at high speeds. The term high speeds refers to spinning speeds of at least 1500 meters/minute, or even at least 2000 meters/minute.

In some embodiments, the filament made using the crystalline TPU composition provided herein is a monofilament filament. In other embodiments, the filament is a multifilament filament.

Filaments made using the TPU compositions described herein can be made at high speeds and exhibit low shrinkage when exposed to elevated temperatures. For example, the filaments exhibit less than 30%, or even less than 25%, or even less than 20%, or even less than 15%, or even, in some embodiments, 10% or less shrinkage when exposed to temperatures of 80° C. for 90 seconds. The percent shrinkage is measured by comparing the length of a filament before and after exposure to elevated temperature.

In one embodiment, the present invention provides a fabric, wherein the fabric comprises one or more fibers, and wherein at least one of the fibers comprises or consists essentially of filaments of the present invention. In this embodiment, the filament comprises or consists essentially of a thermoplastic polyurethane composition as described in detail herein.

ponent, diisocyanate component, antioxidant and catalyst (if used) are heated to 130° C. with stirring. After the reaction reaches 130° C. the heat is removed. The material is poured into a mold and placed in an oven at 120° C. for three hours to cure. In the Examples below, PBS is poly(butanediol) succinate, BDO Adipate is butanediol adipate, and HDO Adipate is hexanediol adipate.

TABLE 1

| Ex. | Polyester (MW) | Isocyanate |
| --- | --- | --- |
| A | BDO Adipate (1300) | MDI |
| B | BDO Adipate (950) | MDI |
| C | HDO, BDO Adipate (2500) | MDI |
| D | HDO Adipate (870) | MDI |
| E | Caprolactone (3000) | MDI |
| F | PBS (4000) | MDI |
| G | PBS (4000) | MDI |

Samples of TPU materials listed above were extrusion spun into filaments and tested for shrinkage. The shrinkage was calculated by comparing the length of a filament sample before and after exposure to the elevated temperature. Changes in filament length were measured after 90 second exposure and an average of 3 readings is reported. Shrinkage measurement were conducted at 50° C. and at 80° C. for 90 second duration on separate samples. The results are reported in Table 2.

TABLE 2

| Ex. | Extrusion Spinning Speed (m/min) | Melt Enthalpy ΔH (J/g) DSC | Cooling Enthalpy (J/g) DSC | Tc (° C.) DSC | Filament Denier | Shrinkage (90 Sec at 50° C.) (%) | Shrinkage 90 sec at 80° C.) (%) |
| --- | --- | --- | --- | --- | --- | --- | --- |
| A | 2200 | 5 | 1 | 121 | 370 | 67 | 72 |
| B | 1500 | 5 | 5 | 46 | 240 | 16 | 46 |
| C | 1875 | 11 | 12 | 101 | 70 | 2 | 16 |
| D | 1830 | 16 | 9 | 63 | 130 | 2 | 26 |
| E | 1500 | 18 | 17 | 161 | 130 | 2 | 7 |
| F1 | 1500 | 60 | 60 | 71 | 180 | 4 | 7 |
| F2 | 2000 | 54 | 56 | 70 | 133 | 4 | 7 |
| F3 | 2200 | 56 | 58 | 72 | 116 | 4 | 8 |
| G1 | 1500 | 47 | 47 | 58 | 180 | 6 | 12 |
| G2 | 2200 | 48 | 48 | 60 | 160 | 7 | 14 |
| G3 | 2500 | 50 | 63 | 63 | 75 | 7 | 14 |

EXAMPLES

Table 1 lists thermoplastic polyurethanes prepared in a one-shot polymerization process wherein the polyol com- Unexpectedly, filaments can be prepared from the crystalline TPU composition described herein using extrusion spinning at high speeds while providing improved shrinkage after exposure to high heat, as shown by Examples E, F1-F3, and G1-G3.

Each of the documents referred to above is incorporated herein by reference, including any prior applications, whether or not specifically listed above, from which priority is claimed. The mention of any document is not an admission that such document qualifies as prior art or constitutes general knowledge of the skilled person in any jurisdiction. Except in the Examples, or whether otherwise explicitly indicated, all numerical quantities in this description specifying amounts of materials, reaction conditions, molecular weights, number of carbon atoms, and the like are to be understood as modified by the word "about." It is to be understood that the upper and lower amount, range, and ratio limits set forth herein may be independently combined. Similarly, the ranges and amounts for each element of the invention can be used together with ranges or amounts for any of the other elements.

As used herein, the transitional term "comprising," which is synonymous with "including," "containing," or "characterized by," is inclusive or open-ended and does not exclude additional, un-recited elements or method steps. However, in each recitation of "comprising" herein, it is intended that the term also encompass, as alternative embodiments, the phrases "consisting essentially of" and "consisting of," where "consisting of" excludes any element or step not specified and "consisting essentially of" permits the inclusion of additional un-recited elements or steps that do not materially affect the basic and novel characteristics of the composition or method under consideration.

While certain representative embodiments and details have been shown for the purpose of illustrating the subject invention, it will be apparent to those skilled in this art that various changes and modifications can be made therein without departing from the scope of the subject invention. In this regard, the scope of the invention is to be limited only by the following claims.

The invention claimed is:

1. An filament comprising:
   a crystalline thermoplastic polyurethane composition comprising:
   the reaction product of (a) a polyisocyanate component, (b) a polyol component, comprising a polyester polyol, wherein the polyester polyol comprises polybutanediol succinate (c) optionally, a catalyst; and (d) optionally, a chain extender component, wherein the crystalline thermoplastic polyurethane composition has a melt enthalpy measured by DSC of at least about 17 J/g and/or a cooling enthalpy measured by DSC of at least about 15 J/g, wherein the filament shrinks less than 15% after exposure to 80° C. for 90 seconds.

2. The filament of claim 1 where the filament is prepared by melt-extrusion.

3. The filament of claim 1 wherein the polyester polyol consists essentially of polybutanediol succinate.

4. The filament of claim 1 wherein the polybutanediol succinate has a number average molecular weight of about 3000 Daltons to about 6000 Daltons.

5. The filament of claim 4, wherein the polybutanediol succinate has a number average molecular weight of about 4000 Daltons to about 6000 Daltons.

6. The filament of claim 1 wherein the thermoplastic polyurethane composition has a melt enthalpy measured by DSC of at least 40 J/g.

7. The filament of claim 1 wherein the thermoplastic polyurethane composition has a cooling enthalpy measured by DSC of at least 40 J/g.

8. The filament of claim 1, wherein the polyol component further comprises up to 50% by weight of a co-polyether.

9. The filament of claim 1, wherein the chain extender component comprises 1,4-butane diol.

10. The filament of claim 1 wherein the polyisocyanate component is selected from diphenyl-methane diisocyanate, hexamethylene diisocyanate, methylene dicyclohexyl diisocyanate, and isomers and mixtures thereof.

11. A fabric comprising the filament of claim 1.

12. A method of making a filament comprising:
    preparing a crystalline thermoplastic polyurethane composition comprising the reaction product of (a) a polyisocyanate component; (b) a polyol component, said polyol component comprising a polyester polyol; and (c) optionally, a chain extender component, wherein the thermoplastic polyurethane has a melt enthalpy of at least about 17 J/g and/or a cooling enthalpy of at least about 15 J/g;
    extrusion-spinning the crystalline thermoplastic polyurethane composition at a speed of at least 1500 m/min to form a filament wherein the filament shrinks less than 15% after exposure to 80° C. for 90 seconds.

13. The method of claim 12, comprising extrusion-spinning the crystalline thermoplastic polyurethane composition at a speed of at least 2000 m/min.

14. The method of claim 12 wherein the polyester polyol comprises polycaprolactone polyol.

15. The method of claim 12 wherein the thermoplastic polyurethane composition has a melt enthalpy measured by DSC of at least 40 J/g.

16. The method of claim 12 wherein the thermoplastic polyurethane composition has a cooling enthalpy measured by DSC of at least 40 J/g.

17. The method of claim 16 wherein the polyester polyol comprises polybutanediol succinate.

* * * * *